United States Patent [19]
Schmidt et al.

[11] Patent Number: 5,738,603
[45] Date of Patent: Apr. 14, 1998

[54] DERAILLEUR

[75] Inventors: Frank Schmidt; Jörg Bodmer; Andreas Neuer, all of Schweinfurt, Germany

[73] Assignee: Fichtel & Sachs AG, Schweinfurt, Germany

[21] Appl. No.: 573,204

[22] Filed: Dec. 15, 1995

[30] Foreign Application Priority Data

Dec. 16, 1994 [DE] Germany .......................... 44 45 035.4

[51] Int. Cl.⁶ .................... F16H 55/30; B62M 9/12
[52] U.S. Cl. ................... 474/158; 474/160; 474/164
[58] Field of Search ........................... 474/155, 158, 474/160, 164, 78, 81

[56] References Cited

U.S. PATENT DOCUMENTS

| | | | |
|---|---|---|---|
| 3,709,053 | 1/1973 | Ohshita | 74/243 R |
| 3,956,943 | 5/1976 | Yamasaki | 74/243 R |
| 4,181,033 | 1/1980 | Nagano | 74/243 R |
| 4,268,259 | 5/1981 | Segawa et al. | 474/160 |
| 4,330,286 | 5/1982 | Nagano | 474/164 |
| 4,348,200 | 9/1982 | Terada | 474/160 |
| 4,519,791 | 5/1985 | Nagano | 474/152 |
| 4,526,558 | 7/1985 | Durham | 474/152 |
| 4,576,587 | 3/1986 | Nagano | 474/152 |
| 4,773,893 | 9/1988 | Su et al. | 474/152 |
| 4,889,521 | 12/1989 | Nagano | 474/164 |
| 4,988,328 | 1/1991 | Iwasaki et al. | 474/160 |
| 5,073,151 | 12/1991 | Nagano | 474/160 |
| 5,085,620 | 2/1992 | Nagano | 474/152 |
| 5,123,878 | 6/1992 | Nagano | 474/160 |
| 5,192,248 | 3/1993 | Nagano | 474/140 |
| 5,192,249 | 3/1993 | Nagano | 474/160 |
| 5,503,598 | 4/1996 | Neuer et al. | 474/78 |

FOREIGN PATENT DOCUMENTS

| | | |
|---|---|---|
| 0002903 | 7/1979 | European Pat. Off. . |
| 0313345 | 4/1989 | European Pat. Off. . |
| 0386685 | 9/1990 | European Pat. Off. . |
| 0417696 | 3/1991 | European Pat. Off. . |
| 0429007 | 5/1991 | European Pat. Off. . |
| 0444645 | 9/1991 | European Pat. Off. . |
| 0474139 | 3/1992 | European Pat. Off. . |
| 0479032 | 4/1992 | European Pat. Off. . |
| 0538780 | 4/1993 | European Pat. Off. . |
| 2469624 | 5/1981 | France . |
| 2243416 | 3/1974 | Germany . |
| 2758416 | 6/1978 | Germany . |
| 2836066 | 3/1979 | Germany . |
| 2836258 | 3/1979 | Germany . |
| 2837270 | 3/1979 | Germany . |
| 3037857 | 4/1981 | Germany . |
| 2945271 | 5/1981 | Germany . |
| 0475021 | 11/1937 | United Kingdom . |
| 2005363 | 4/1979 | United Kingdom . |
| 9414644 | 7/1994 | WIPO . |

*Primary Examiner*—Roger L. Schoeppel
*Attorney, Agent, or Firm*—Nils H. Ljungman and Associates

[57] ABSTRACT

Derailleur with at least two sprockets on a sprocket set which is located around a pedal axle of a bicycle, which sprockets are provided with chain transfer assistance measures to assist the transfer of the chain in upshifting or downshifting, whereby the shifting can be done under load in both of these directions. The chain transfer assistance measures comprise a tooth space with a spiral-shaped base, a conical rivet with an encircling sharp edge to locate the chain in the vicinity of its links between the chain plates, as well as bevels, recesses and steps, the totality of which optimize the chain transfer in both directions between sprockets which are coordinated with one another.

20 Claims, 7 Drawing Sheets

DERAILLEUR

BACKGROUND OF THE INVENTION

1. Field of the Invention:

The present invention relates to a derailleur, in particular for bicycles, which includes a driving sprocket set and a driven sprocket set, as well as a chain which connects these two sprocket sets to one another, the chain including links, pins, outer chain plates and inner chain plates, at least one of the sprocket sets being realized with at least two sprockets, namely a large sprocket and a medium sprocket, as well as preferably with a small sprocket, whereby in addition, the two sprockets of the sprocket set each have a multiplicity of teeth, the chain being preferably formed by chain links arranged in a series, and by inner chain plate pairs and outer chain plate pairs in alternating series between the chain links, whereby in addition, to shift the chain between the two sprockets of the sprocket set, there is provided a shifting (or chain transfer) device in an inlet area, in which, in the normal direction of circulation of the chain and of the sprockets, the chain runs into the sprocket set, and this shifting device is realized so that it imparts movements to the chain in a direction parallel to the center axis of the sprocket set, and whereby the sprockets each have peripheral areas in which the shifting of the chain between the sprockets is facilitated, whereby, moreover, during the shifting of the chain between the sprockets of the sprocket set, chain transfer paths between the sprocket from which the chain is being shifted and the sprocket to which the chain is being shifted are realized, whereby in at least one peripheral area of the sprockets of the sprocket set, design measures are implemented to facilitate the shifting of the chain between the two sprockets in this peripheral area, and to define the corresponding chain transfer paths.

2. Background Information

European Patent No. 474 139 A1 relates to a derailleur with a front sprocket set, the large sprocket of which has a chain transfer assistance device located on its side facing the smaller sprocket, in which chain transfer assistance device an outer chain plate of the chain is engaged, which lies at a distance from the exiting tooth on the neighboring small sprocket which is a whole number multiple of the chain pitch. The chain transfer assistance device consists either of a tooth which is displaced radially inward, which is oriented in the direction of the neighboring small sprocket, or of a plate which is realized as a sprocket segment, and transfers the chain to a first tooth which has a modified shape. Chain transfer assistance devices which project very far out of the running plane of the chain are dangerous with regard to the chain running off track (and/or perhaps skewing) on the rear derailleur during shifting while the rider is pedalling forward or in reverse, in particular when there are large differences in diameter between the sprockets, on account of the tendency of the chain to automatically and unintentionally upshift to the respectively larger sprocket, which can result in failed attempts at shifting or in the chain being thrown off the sprocket altogether.

German Patent No. 30 37 857 C2 relates to a sprocket set that includes two sprockets with at least two teeth omitted on the periphery and with a projection located in the place of the omitted tooth, the purpose of which is to cause the chain to be transferred to the larger of the two sprockets. The solution taught by this invention results in a satisfactory shifting quality only if several specified requirements are met. Of course it is not impossible that a satisfactory shift quality will be achieved for an arbitrary pairing of two sprockets. But when an inner plate collides with the projection, however, it is difficult, if not impossible, to guarantee a proper shift quality. Moreover, one tooth space may be insufficient in terms of providing an effective passage for the chain during shifting from the smaller sprocket to the larger sprocket.

OBJECT OF THE INVENTION

One object of the present invention is to further facilitate the transfer of the chain, in particular from the larger sprocket to the smaller sprocket, but if necessary also from the smaller sprocket to the larger sprocket. A particular object of the invention is to make certain that if a shift is made under load from one sprocket to another, this shifting action will be performed smoothly, safely and quietly, and to guarantee that the chain engages with the newly-selected sprocket as quickly as possible.

SUMMARY OF THE INVENTION

The invention teaches that this object can be achieved by means of the characteristics disclosed in the claims.

In summary, one aspect of the invention resides broadly in a sprocket assembly, such as for a bicycle, for driving a link chain, the sprocket assembly including a plurality of sprockets and being adapted for use in conjunction with a derailleur for shifting the link chain between the plurality of sprockets, the sprocket assembly comprising: a first sprocket member; a second sprocket member; the first and second sprocket members having a common substantially central axis of rotation; the first and second sprocket members both having a common direction of forward rotation about the substantially central axis of rotation; each of the first end second sprocket members being a substantially planar member extending radially outward from the common substantially central axis of rotation; the first sprocket member being disposed in a first sprocket plane, and the second sprocket member being disposed in a second sprocket plane substantially parallel to the first sprocket plane, each of the first sprocket plane and the second sprocket plane being aligned at a substantially right angle with respect to the common substantially central axis of rotation; the first sprocket member having an inner face facing the second sprocket member and an outer face opposite to the second sprocket member; the first sprocket member having a first substantially circular sprocket periphery and first sprocket teeth projecting radially outward from the common substantially central axis of rotation, the first sprocket teeth being disposed about the circumference of the first sprocket periphery; the second sprocket member having a second substantially circular sprocket periphery and second sprocket teeth projecting radially outward from the common substantially central axis of rotation, the second sprocket teeth being disposed about the circumference of the second sprocket periphery; the first sprocket member having a substantially greater diameter than the second sprocket member; a chain transfer assistance member projecting from the inner face of the first sprocket member toward the second sprocket member; the chain transfer assistance member being disposed between the first sprocket teeth and the common substantially central axis of rotation; the chain transfer assistance member having a substantially curvilinear outer perimeter disposed in a plane substantially parallel to the first sprocket plane; the first sprocket periphery comprising a normal portion and a chain upshifting portion; the normal portion of the first sprocket periphery comprising a multiplicity of the first sprocket teeth disposed along the first sprocket periphery at positions of substantially equal tooth pitch; and the chain upshifting portion of the first sprocket periphery comprising: a tooth space disposed at a position of the substantially equal tooth pitch with respect to the multiplicity of the first sprocket teeth; and a capture tooth positioned adjacent the tooth space, and trailing the tooth space along the circumference of the first sprocket member in the direction of forward rotation, the capture tooth having a beveled tooth tip, the beveled tooth tip having a beveled surface on the outer face if the first sprocket member opposite to the second sprocket member; the beveled surface extending from the outer face of the first sprocket member opposite the second sprocket member in a direction toward the second sprocket member.

BRIEF DESCRIPTION OF THE DRAWINGS

The accompanying drawings illustrate one preferred embodiment of the invention, wherein.

DESCRIPTION OF THE PREFERRED EMBODIMENT

Figure 1:
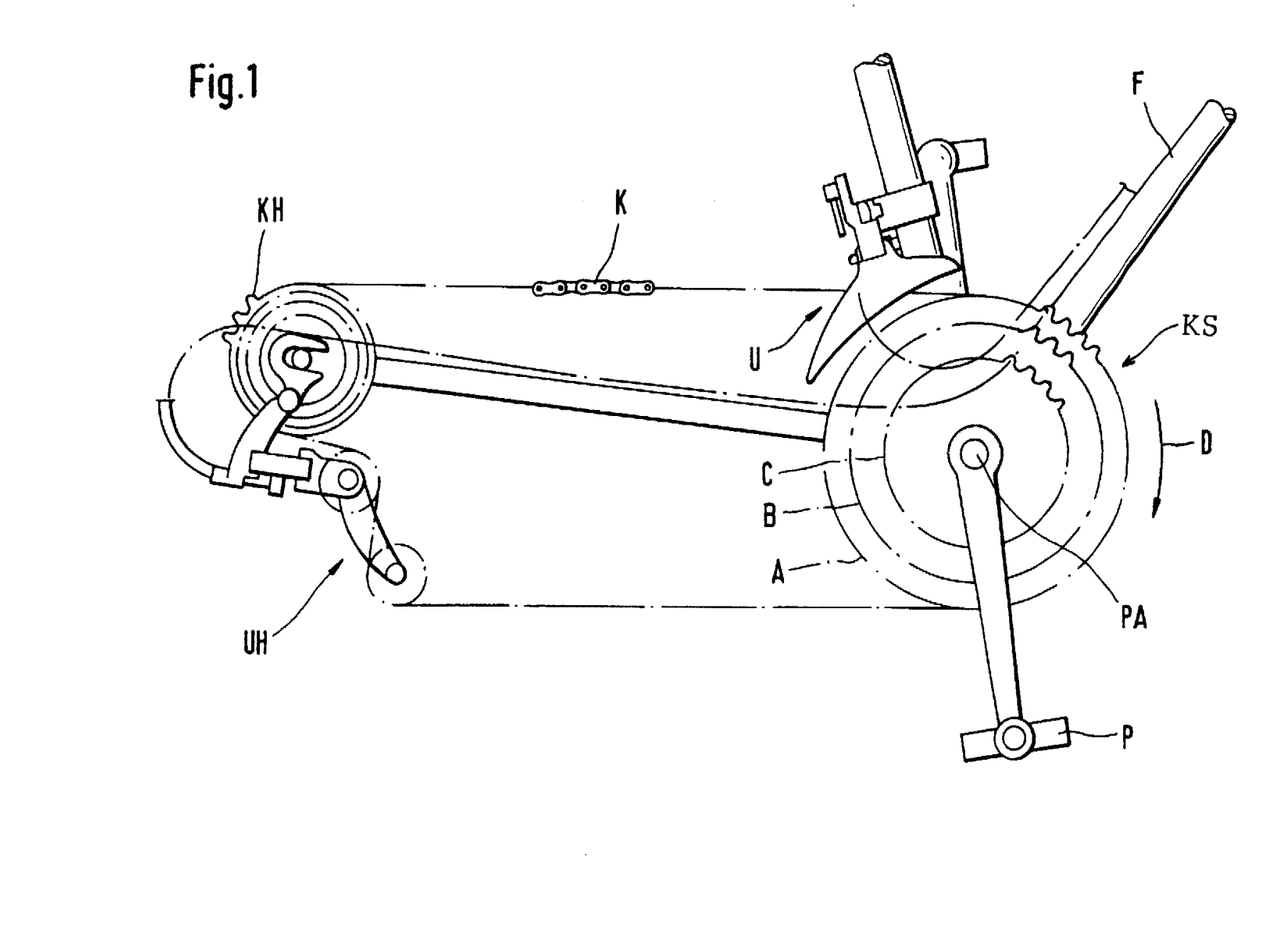
FIG. 1 is a partial elevational view of a bicycle frame showing the layout of a derailleur, with a front and rear shifting device, as well as a driving and driven sprocket set.

FIG. 1 shows a section of a bicycle frame F with a front sprocket set KS which is rotationally fastened to a pedal shaft PA with pedals P, a rear sprocket set KH, a chain K, a front chain transfer device U and a rear chain transfer device UH. When the front sprocket set KS turns in the clockwise direction, the bicycle travels forward, and the chain K then runs in the direction of circulation D together with the front sprocket set KS and the rear sprocket set KH. In the illustrated example, the sprocket set KS includes a large sprocket A, a medium sprocket B and a small sprocket C, on which the chain K runs selectively to generate various transmission ratios.

Figure 2:
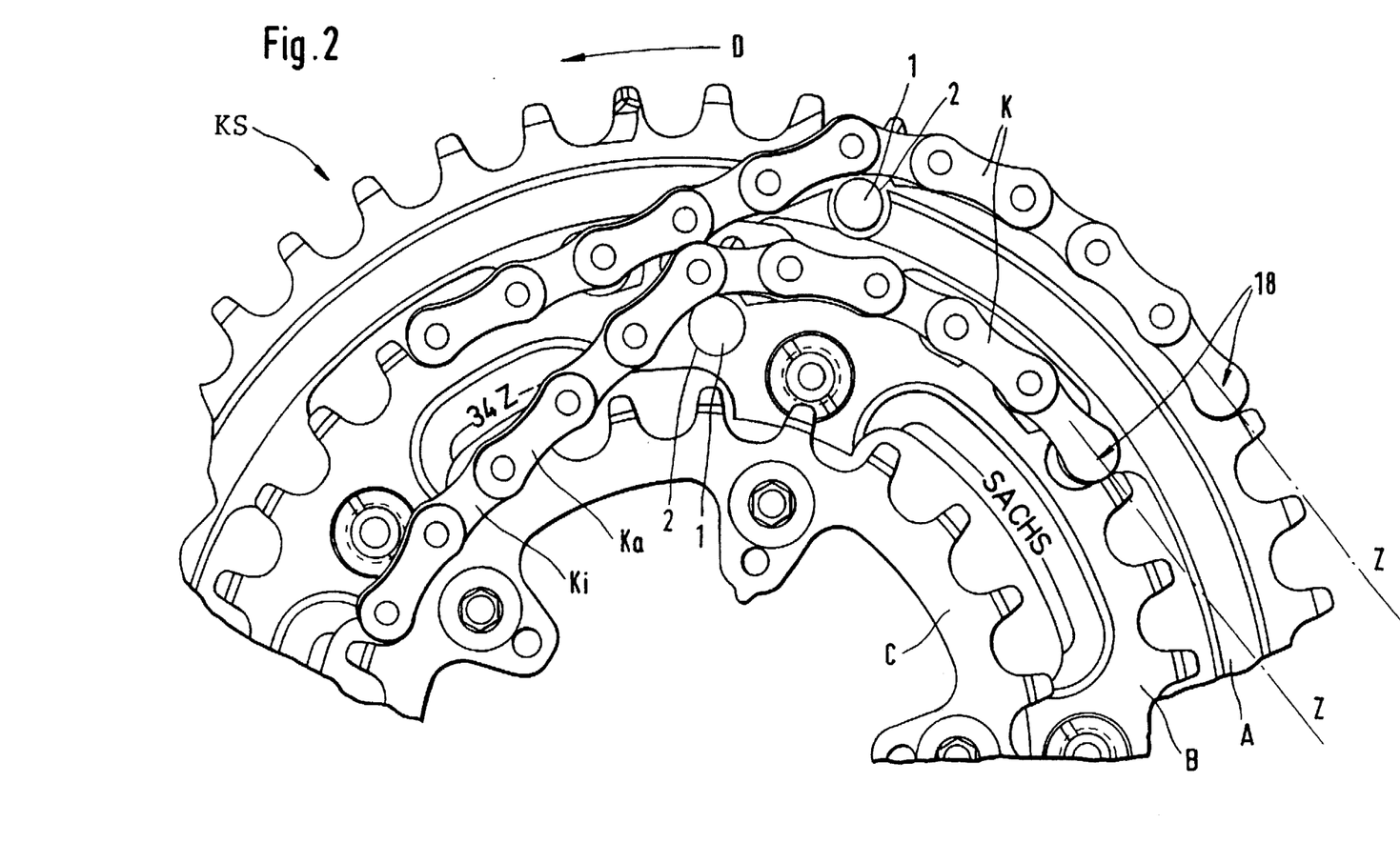
FIG. 2 is a partial plan view, through the bicycle frame, of a front sprocket set with a large sprocket, a medium sprocket and a small sprocket, and on each of the sprockets, a chain which is being shifted from the smaller sprocket to the respective larger sprocket.

FIG. 2 shows a segment of the sprocket set KS, on which the chain K is illustrated twice, for purposes of simplicity, once in the shift position shortly after the upshifting from the medium sprocket B to the large sprocket A, and again shortly after the upshifting from the small sprocket C to the medium sprocket B. It will be seen, particularly from FIG. 2 that, during the transfer to the respective larger sprocket the chain K, which consists essentially of a series of links interconnected by pins 3, the links alternately including inner plates Ki and outer plates Ka, is in contact with a conical rivet 1, before it engages the teeth of the large sprocket A and the medium sprocket B. The conical rivet 1 has an encircling edge 2 which is sharp and represents the largest diameter of the conical rivet 1. The conical rivet 1 preferably tapers inward (e.g., its diameter is reduced) in the direction toward the planar surface of the respective sprocket A or B and forms the sharp encircling edge 2 whose sides form an angle of less than 90 degrees, which allows the chain K to be supported on the edge 2 by means of the gap resulting between the inner plate Ki and the outer plate Ka in the vicinity of the pin 3, without regard to whether the chain K arrives at the conical rivet 1 with an outer plate Ka as shown in FIG. 2, or with an inner plate Ki, thereby guaranteeing a spot contact of the chain K on the conical rivet 1 preferably directly underneath the pin 3, regardless of the sequence or order of the chain plates. That is, the sharp edge 2 of the conical rivet 1 can be positioned such that it engages the links of the chain K, in a plane parallel to the sprockets A, B and C, where the inner links Ki and outer links Ka of the chain K abut one another in the area of the pins 3. However, it is also possible for the sharp edge 2 to contact the chain K at a position that is axially interior (e.g., closer to the respective larger sprocket A or B) of the plane of abutment between the inner links Ki and the outer links Ka. The position of the sprockets A and B in relation to one another is preferably approximately such that the area of the chain K around the pin 3 always matches up with the edge 2 of the conical rivet 1, such that a line connecting the centers of the conical rivet 1 and the pin 3 is approximately perpendicular to a hypothetical line from pin 3 to pin 3 of the chain K.

Figure 8:
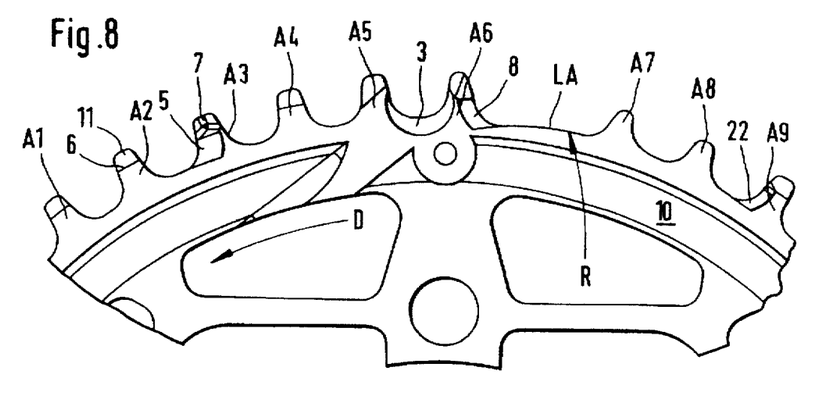
FIG. 8 is a partial plan view of the large sprocket.
Figure 9:
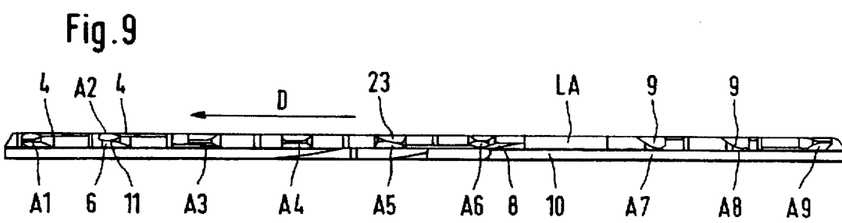
FIG. 9 is a top view of the large sprocket showing the periphery thereof.
Figure 10:
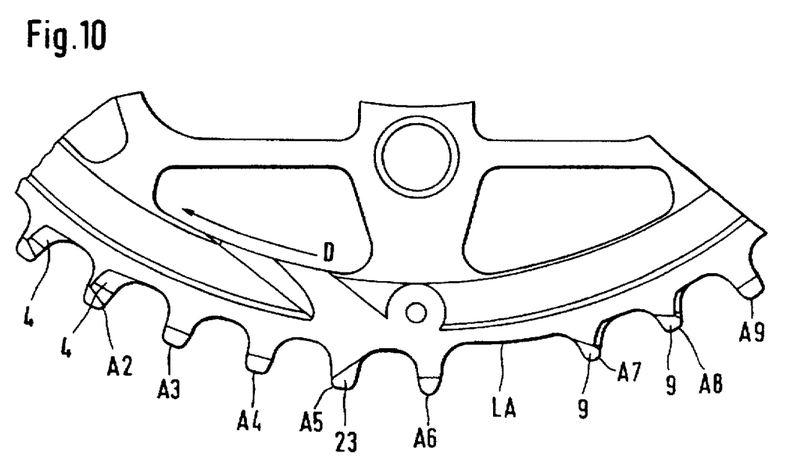
FIG. 10 is a partial plan view from the other side of the large sprocket.
Figure 11:
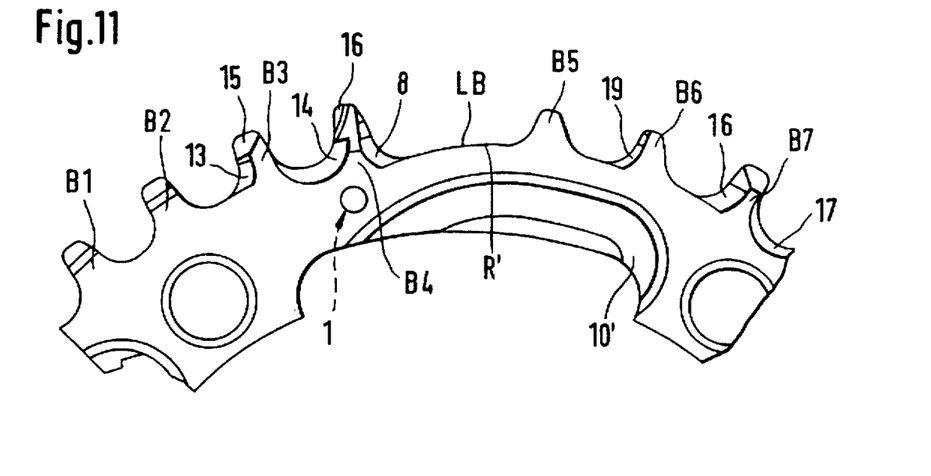
FIG. 11 is a partial plan view of the medium sprocket.
Figure 12:
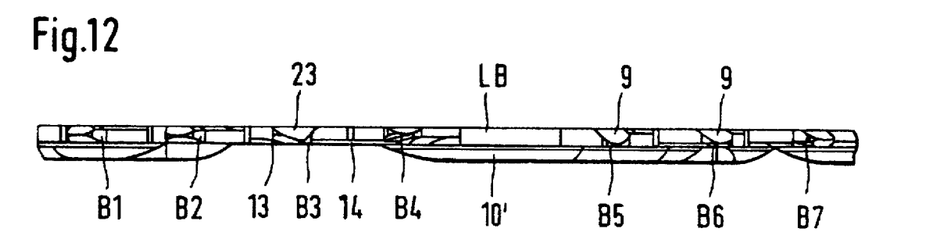
FIG. 12 is a top view of the medium sprocket.
Figure 13:
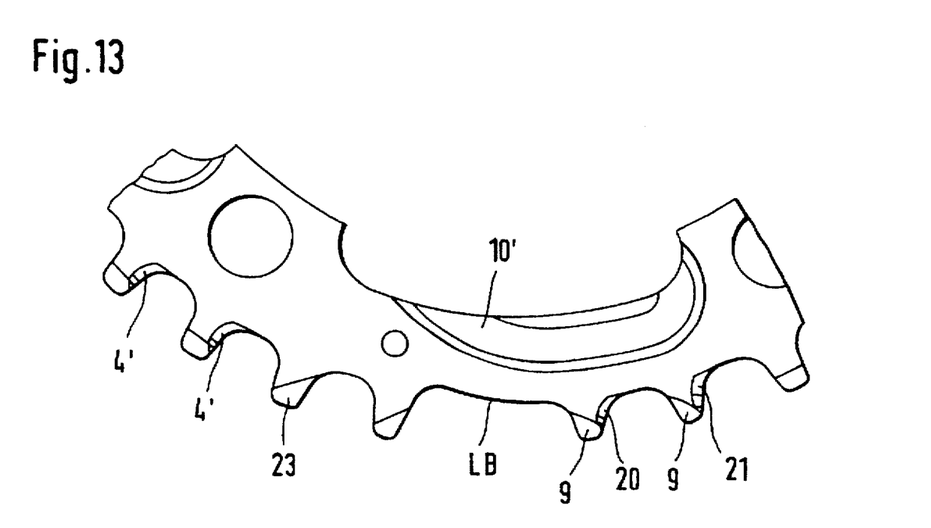
FIG. 13 is a partial plan view from the other side of the medium sprocket.

As shown most particularly in FIGS. 8–13, the following sequential numbering system is employed herein for those teeth on the sprockets A and B having a shape which differs from the other "normal teeth": A1 . . . A9 on the large sprocket A as shown in FIGS. 8–10, and B1 . . . B7 on the medium sprocket B as shown in FIGS. 11–13. "Normal" teeth, as the term is used herein, are preferably beveled on their tips inward from both sides of their planar surfaces, and thus form a more or less sharp edge in the circumferential direction, so that the chain is guided into the row of teeth in both directions of circulation, in particular when the chain enters at an angle, and so that the chain is properly centered on the row of teeth.

In FIGS. 2 end 4, the chain K is shown following a shifting path from the medium sprocket B to the larger sprocket A, i.e. via the conical rivet 1, through a tooth space LA, and over a capture tooth A7 which engages the chain K between an outer chain plate pair Ka or an inner plate pair Ki and thereby reliably guides the chain K into the row of teeth, even under load. Referring most particularly now to FIGS. 8–10, the capture tooth A7 has a capture bevel 9 which is located on the planar side of the large sprocket A facing away from the medium sprocket B. The capture bevel 9 slants inward toward the center of the large sprocket A at a sufficiently sharp angle such that its tooth tip coincides approximately with the opposite (or inward) planar surface of the large sprocket A facing the medium sprocket B. The tooth A8, which follows the tooth A7 in the peripheral direction D, is also realized in the form of a capture tooth and is also provided with a capture bevel 9, so that shifts which are caused by insufficient shifting pressure do not result in shifting errors, in particular when the tooth A8 comes into contact with an inner plate Ki. The tooth space LA has a tooth base with a radius R which is directed gradually radially inward in the peripheral direction D (i.e., in the direction of normal forward rotation about the pedal shaft PA) in a spiral fashion, to provide the necessary contact for the outer plates Ka and/or the inner plates Ki. The tooth space base radius can, in other embodiments, be directed radially inward along a number of other paths, such as for example, a helical path or an eliptical path. The tooth A6, which precedes the tooth space LA in the direction of circulation D (i.e., the normal direction of forward rotation), has a leading (or upshift) bevel 8 which forms a space, and which also improves the passage for the chain guide through the tooth space LA. That is, the bevel 8 provides clearance for the chain K to slant axially across the tooth space LA during an upshift so that the capture teeth A7 and A8 can engage the chain K in the spaces between the inner and outer chain link pairs Ki and Ka, respectively, by way of their capture bevels 9.

To prevent the chain K from falling or otherwise becoming disposed in the axial gap between the large sprocket A and the medium sprocket B and becoming jammed, the large sprocket 10 on is provided with a generally annular convexity (or bulge or swelling) that extends axially inward and which is positioned about its periphery but radially inward of the root circle of the teeth A. At the position of the chain transfer, viewed in the direction of circulation D, which is ahead of the passage of the chain K through the tooth space LA (e.g., radially inside the tooth A5), the annular convexity 10 is interrupted by a recess, which slants radially outward and generally follows the path of the chain K in shifting radially outward from the medium sprocket B to the large sprocket A. For the same reasons, a similar convexity 10' is also provided on the medium sprocket B, convexity 10' also being interrupted in the chain transfer area, to facilitate the shifting of the chain K from the small sprocket C to the medium sprocket B. The requirements for the chain transfer in this case are otherwise the same, whereby, referring most particularly to FIGS. 11–13, the conical rivet 1, a tooth space LB, a capture tooth B5, a second capture tooth B6, the capture bevels 9, the radius R' and the leading (or upshift) bevel 8 perform functions which are similar to those of the chain transfer described above from the medium sprocket B to the large sprocket A.

Figure 3:
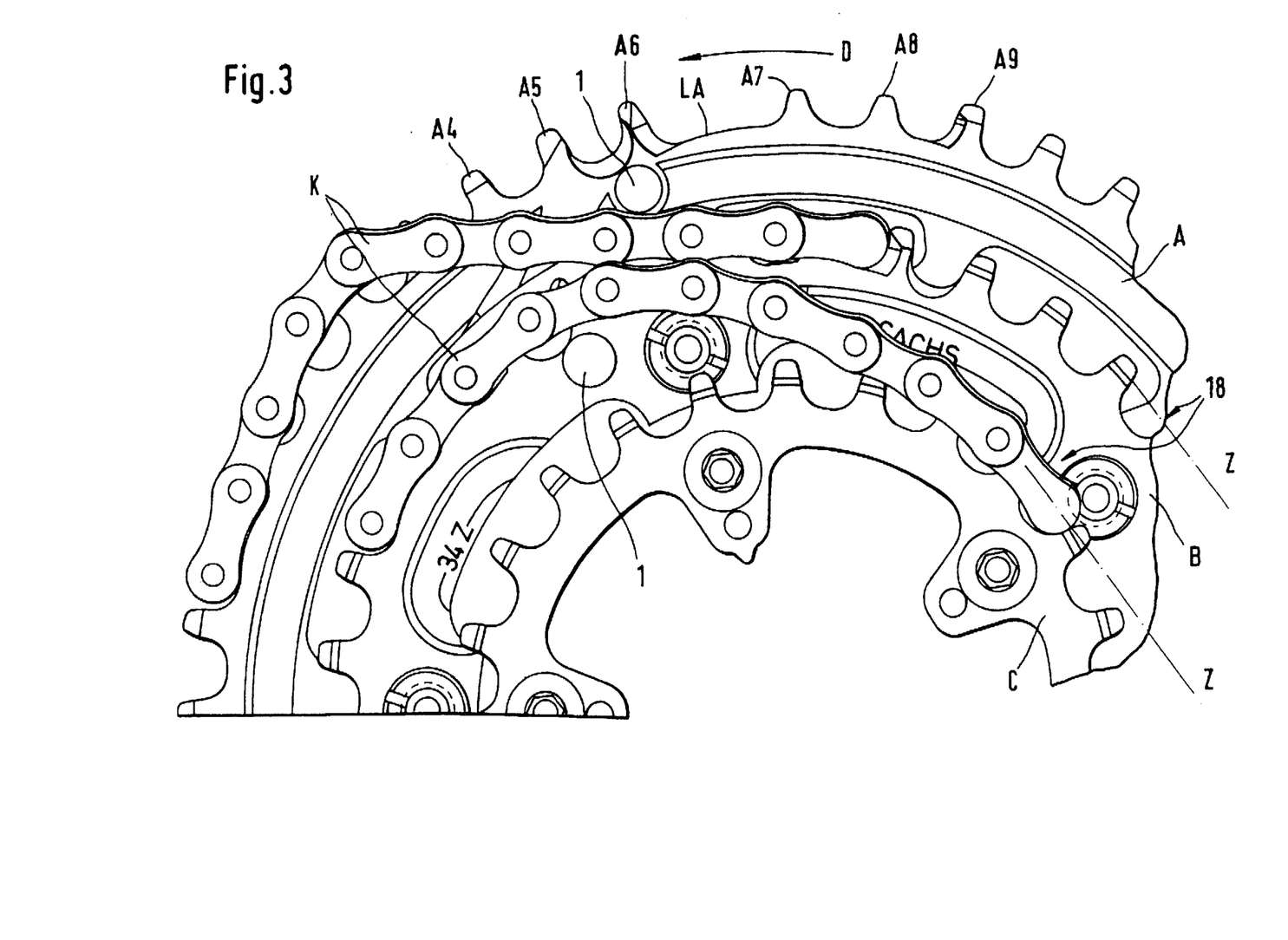
FIG. 3 is a partial plan view of the sprocket set illustrated in FIG. 2, wherein the chain is being shifted from the larger sprocket to the respective smaller sprocket.
Figure 4:
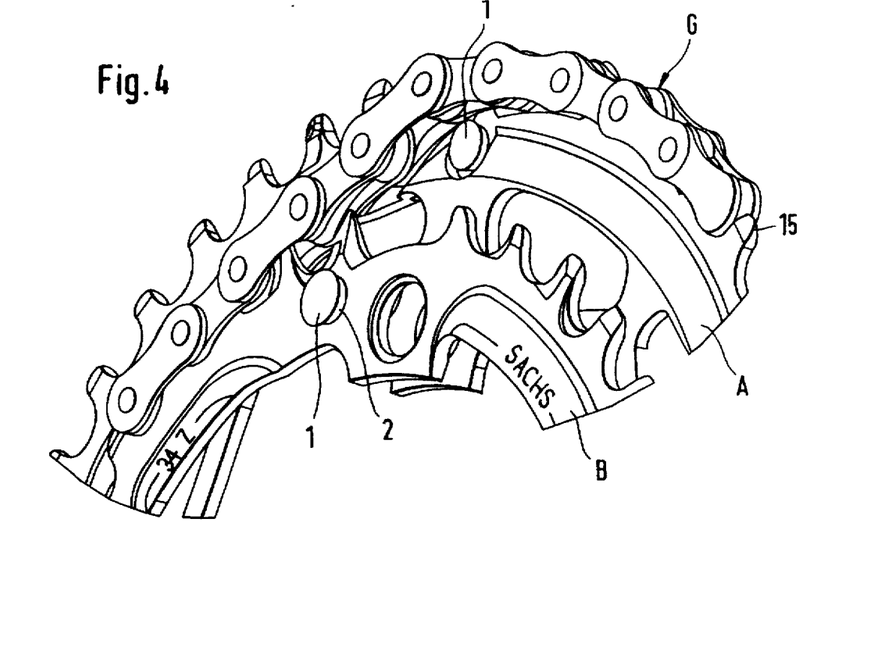
FIG. 4 is a partial perspective view of the sprocket set showing the shifting of the chain from the medium sprocket to the large sprocket by means of a conical rivet.
Figure 5:
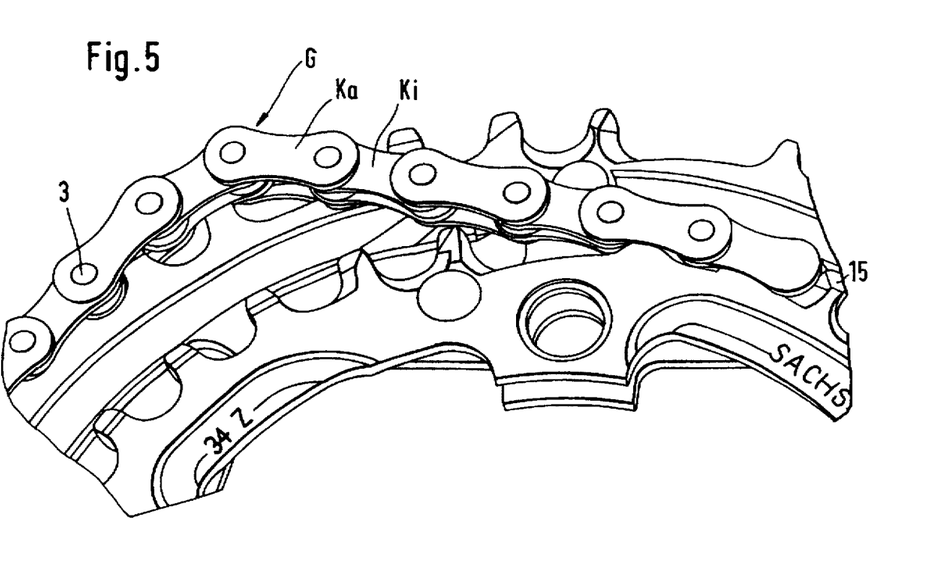
FIG. 5 is a partial perspective view showing the path of the chain during shifting from the large sprocket to the medium sprocket.
Figure 6:
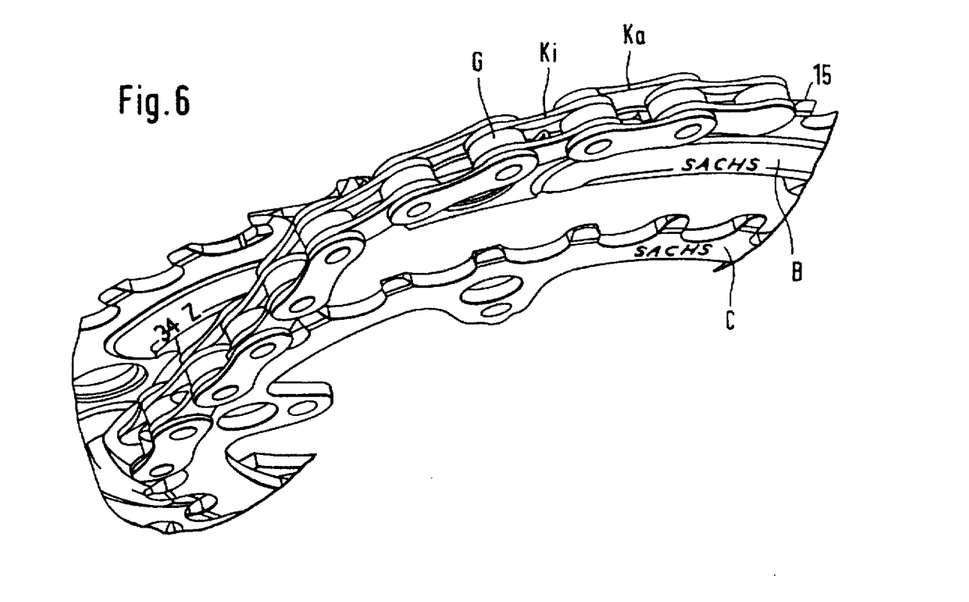
FIG. 6 is a partial perspective view showing the chain during shifting from the small sprocket to the medium sprocket.
Figure 7:
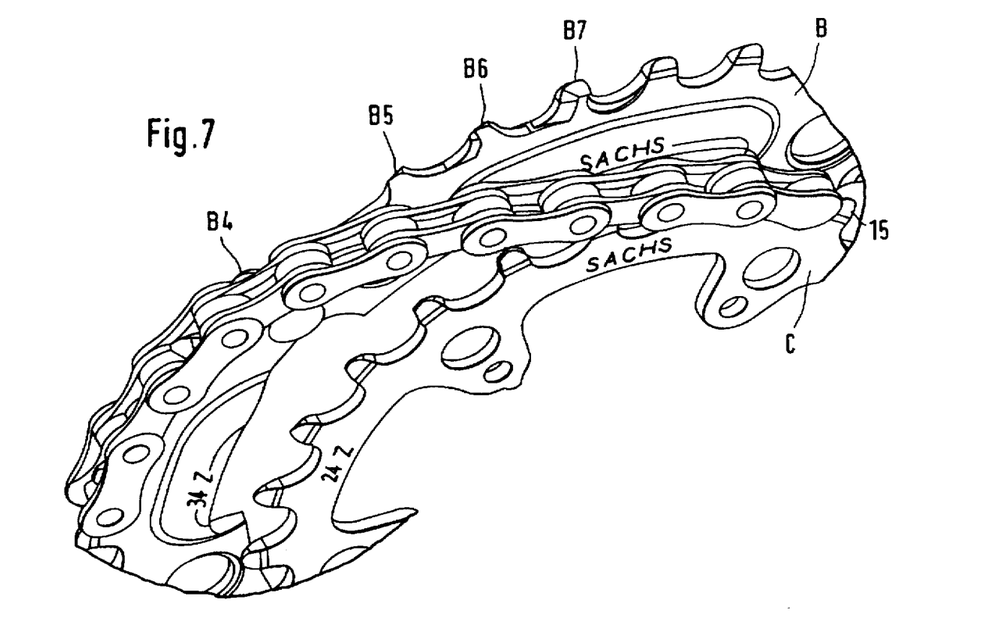
FIG. 7 is a partial perspective view showing the chain in the downshift position from the medium sprocket to the small sprocket.

FIGS. 3, 5 and 7 show a preferred path of the chain K, when the chain is to be shifted from the respectively larger sprocket to the respectively smaller sprocket, that is from the large sprocket A to the medium sprocket B, or from the medium sprocket B to the small sprocket C. The paths are selected so that the position of the sprocket A previously defined for the upshifting from the sprocket B, or from the sprocket C to the sprocket B, also arrive at a chain inlet during downshifting where the teeth engage between the plate pairs, and do not collide with the pin. In general, it should be noted here that the position of the chain outlet must always be adapted to the diameter of the specific sprocket. In this case, the positions of the chain outlet are defined for sprockets A with 44 teeth, B with 34 teeth and C with 24 teeth. If the numbers of teeth are changed at any point of the sprocket set KS, the positions of the chain outlet must be redefined, if the positions of the chain transfer from the smaller to the larger sprocket are fixed.

In the specific case illustrated here, the chain K, if it is to be shifted down from the sprocket A, will lie first with its plates outside the sprocket A, when an inner plate pair Ki arrives there. To this end, the tooth A2 is provided with a bevel 11 which creates the space required for the inner plate Ki to move outside (i.e., radially inward of) the gear teeth A, and also a step (or axially projecting surface) 6, on which the inner plate Ki is supported, before the rest of the chain K drops to the medium sprocket B.

In other words, one preferred transfer path for the transfer of the chain K from the large sprocket A to the medium sprocket B, is via an inner link Ki of the chain K encountering the large sprocket tooth A2 as the large sprocket A is rotated in the normal forward direction via the pedals P. If at such time the front chain transfer device (or derailleur) U is urging the chain K axially inward toward the center of the bicycle frame F in FIG. 1, the bevel 11 provided on tooth A2, which slants from the inner face of the large sprocket A to the outer face thereof, will be able to slide outside of the inner link Ki such that the inner link Ki will slide down the bevel 11 and come to rest temporarily on the projecting step 6 positioned on tooth A2 at the base of the bevel 11. The chain K is thereafter lowered onto the medium sprocket B as the large sprocket A continues its normal direction of forward rotation.

If, on the other hand, an outer plate pair Ka encounters the tooth A2, outlet bevels 4 provided on the teeth A1 and A2 allow the chain K to be displaced axially toward the medium sprocket B, and a spherical chamber 7 on the tooth A3 causes the inner plate Ki which arrives there to drop outside (i.e., axially inward of) the tooth A3, and to clear the way for the chain K to shift down to the medium sprocket B. For improved guidance of the inner plate Ki, there is also a recess 5 provided on the base portion of the tooth A3, which guarantees that the chain K, as described above and as illustrated in FIG. 3, rides up before it shifts down to the medium sprocket B.

In other words, a second downshift route is provided in the event an outer pair of chain links Ka encounters the tooth A2 at the time that the front chain transfer device (e.g., derailleur) U is urging the chain K inward toward the center of the bicycle frame F. In such case, the tooth A2 engages between the outer plates Ka arriving there, while the next trailing tooth A3 is the first tooth to move outside of the chain K due to the provision of the outlet bevels 4 at the bases of the preceding teeth A1 and A2, which allow the chain K to move axially inward, the spherical chamber 7 provided on the tip of the tooth A3, which moves outside of the inner plate Ki arriving there. At this point, inner plates Ki of the chain K are inside of the tooth A3 and are able to drop down to medium sprocket B via the recess 5 provided at the base of the leading edge of the tooth A3.

The spherical chamber 7 is preferably provided in the shape of a convex surface having sharp or beveled edges, for example, in the form of a tetrahedron or polyhedron, as shown in FIG. 2. However, other shapes are possible, for example, a simple convex half-spherical shape. The particular shape is guided by the purpose of deflecting the chain lank outside the plane of the larger sprocket A and toward the medium sprocket B.

Another possible but not preferred path for shifting the chain K from the large sprocket A is the tooth A9, which is initially positioned outside an inner chain plate pair Ki by means of its bevel 22. Such an opportunity occurs if the use of the shifting force is connected with a small amount of tension on the chain at the described point. In that case, there is no outlet (or downshift) path for the chain K, if an outer plate Ka arrives there.

When the sprocket set KS is pedalled in reverse (or "backpedalled"), if the chain K enters at an angle, the position of the tooth spaces LA and LB can make the system susceptible to unsuccessful shifting, for which reason a deflector bevel 23 is located on the tooth A5.

The shifting of the chain K from the medium sprocket B to the smaller sprocket C occurs in a manner which is essentially similar to the shifting process described above from the large sprocket A to the medium sprocket B. The chain K, if it is to be shifted down from the medium sprocket B, can initially lie on the tooth B3 with its plates outside inner planar face of the sprocket B, if an inner plate pair Ki arrives there. The tooth B3 has a bevel 15 which directs the inner plate Ki toward the inner planar face of the medium sprocket B, as well as a bevel 13 which creates the necessary space for the inner plate Ki to move outside the gear teeth. There are also bevels 4' on the teeth B1 and B2 which make it possible for the inner plate Ki on the tooth B1 and the outer plate Ka on the tooth B2 to move toward the center of the tooth. A recess 14 then gives the following outer plate Ka come clearance to facilitate the passage by dipping into the plane surface of the medium sprocket B. In this case, the downshift path described for the chain is possible only if an inner plate Ki arrives at the tooth B1, an outer plate Ka at the tooth B2, and an inner plate Ki outside the tooth B3. If an outer plate Ka arrives at tooth B1, an inner plate Ki at tooth B2, and an outer plate at tooth B3, the earliest opportunity for the chain K to place an inner plate Ki outside the row of teeth is before it reaches the tooth space LB on the tooth B4. In this case, the chain passage is assisted by a deflecting bevel 23, the purpose of which is to deflect the inner plate Ki during reverse rotation in the event of a skewing of the chain K, and a bevel 16 which has two different angles and transports the inner plate Ki outward.

A second possible path for the downshifting of the chain K from the medium sprocket B is the tooth B6, which is initially located outside an inner plate pair Ki by means of its bevel 19, and by means of a bevel 20 on the tooth B6. If an outer plate Ki arrives at the tooth B6, the tooth 7 is the one which comes to lie by means of its bevel 16 outside the inner plate Ki. At this point, the downshifting of the chain is assisted by a downshift (or outlet) bevel 21 on the tooth B6, which allows the outer plate Ka to approach the plan surface of the medium sprocket B. At the same time, the above-mentioned downshift bevel 20 is activated with respect to the inner plate Ki which is entering there. Finally, a recess 17 between the tooth B7 and the following normal tooth facilitates the downshifting of the chain by engagement of the subsequent outer plate Ka.

One feature of the invention resides broadly in the derailleur, in particular for bicycles, comprising a driving sprocket set KS and a driven sprocket set KH as well as a chain K which connects these two sprocket sets to one another, with links G, pins 3, outer chain plates Ka and inner chain plates Ki, whereby at least one KS of the sprocket sets is realized with at least two sprockets, namely a large sprocket A and a medium sprocket B as well as with a small sprocket C, whereby in addition, the two sprockets A, B, C of the sprocket set KS each have a multiplicity of teeth A1 ...; B1 .... whereby the chain K is formed by chain links G in a series, and by inner chain plate pairs Ki and outer chain plate pairs Ka in alternating series between the chain links G, whereby in addition, to shift the chain K between the two sprockets A, B of the sprocket set KS, there is a shifting (or transfer) device U in an inlet area 18, in which, in the normal direction of circulation D of the chain K and of the sprockets A, B, C, the chain K runs into the sprocket set KS, and this shifting device U is realized so that it imparts movements to the chain K in a direction parallel to the center axis of the sprocket set KS, and whereby the sprockets A and B each have peripheral areas in which the shifting of the chain B between the sprockets C, B and A is facilitated, and in which the path of the corresponding chain transition travel is defined, characterized by the following features: in the peripheral area corresponding to the shift from the smaller sprocket C to the medium sprocket B or from the medium sprocket B to the large sprocket A, a tooth is omitted on the respectively larger sprocket A or B, thereby forming a tooth space LA or LB which, in the normal direction of circulation D, forms a passage for the outer chain plates Ka or the inner chain plates Ki of the chain K facing the sprocket; on the respective larger sprocket A or B, on the plan surface toward the respectively smaller sprocket B or C, there is a conical rivet 1 with an encircling sharp edge 2 near the tooth A6 or B4 to support the chain K at a point around the link G in the joint between the outer plate Ka and the inner plate Ki when the chain K is shifted to the respectively larger sprocket B or C through the passage formed by the tooth space LA or LB respectively; the tooth A7 which follows the tooth space LA or LB in the direction of circulation D is realized in the form of a capture tooth, so that by means of a capture bevel 9 and the displacement of the tooth tip in the vicinity of the plan surface of the sprocket A or B facing the respective smaller sprocket, the capture tooth can also become engaged both between the outer chain plates Ka and between the inner chain plates Ki.

Another feature of the invention resides broadly in the derailleur characterized by the fact that the respectively larger sprockets A or B, in at least one point in the vicinity of the tooth space LA or LB, have teeth A1 and/or A2 or B1 and/or B2 respectively with transfer assistance measures, which make it easier for the chain K to leave the respective sprocket A or B for the transition to the respective neighboring smaller sprocket.

Another feature of the invention resides broadly in the derailleur characterized by the fact that the path of the base of the tooth space LA, LB follows a curvature, the approximate radius R of which, viewed in the direction of circulation D, runs backward and radially outward, and gives the base a path of a spiral, and thus adapts the passage for the ascent of the chain toward the capture tooth A7, B5 for the transfer of the chain from the respective smaller sprocket C, B to the respective larger sprocket B, A.

Still another feature of the invention resides broadly in the derailleur characterized by the fact that the tooth A6, B4 which precedes the passage in the direction of circulation D is provided with an inlet (or entry) bevel 8 to improve the engagement of the capture teeth A7, B5 between the inner plates Ki of the chain K in particular as the chain K passes through the tooth space LA, LB.

A further feature of the invention resides broadly in the derailleur characterized by the fact that the second tooth A8, B6 trailing the tooth space LA, LB, viewed in the direction of circulation D, is also realized in the form of a capture tooth with a bevel 9.

Another feature of the invention resides broadly in the derailleur characterized by the fact the transfer assistance measures on the teeth in the position in the vicinity of the tooth space LA on the large sprocket A, viewed in the direction of circulation D, preceding the tooth space LA, are outlet bevels 4 on the teeth A1 and A2, a step 6 on the tooth A2 and a recess 5 on the tooth A3, whereby two outlet possibilities for the chain K to the adjacent smaller sprocket B are created.

Yet another feature of the invention resides broadly in the derailleur characterized by the fact that the transfer assistance measures on the teeth in the position in the vicinity of the tooth spaces L,B on the medium sprocket B, viewed in the direction of circulation D, preceding the tooth space L, B are outlet bevels 4 on the teeth B1 and B2, a bevel 13 on the tooth B3, a recess 14 between the teeth B3 and B4 and a bevel 15 on the tooth B3 as well as a bevel 16 on the tooth B4, for the purpose of representing two paths for shifting the chain down to the neighboring smaller sprocket C.

Still another feature of the invention resides broadly in the derailleur characterized by the fact that the transfer assistance measures on the teeth in the position in the vicinity of the tooth spaces L, B on the middle sprocket B, viewed in the direction of circulation D, trailing the tooth space L, B also consist of a bevel 19 on the tooth B6, a bevel 16 on the tooth B7, a recess 17 between the teeth B7, B8, an outlet bevel 20 on the tooth B5 and an outlet bevel 21 on the tooth B6, which describe two additional possibilities for the transfer of the chain K down to the neighboring smaller sprocket.

A further feature of the invention resides broadly in the derailleur characterized by the fact that the sprockets A and B, at each two diametrically opposite peripheral points, have chain transition areas with the tooth spaces L,A and L,B and with the modified teeth A1–A9 and B1–B7 respectively, whereby the chain transition always takes place during the generation of the lowest torque by the bicycle rider at the "top" or "bottom" pedal position.

Another feature of the invention resides broadly in the derailleur characterized by the fact that a deflecting bevel 23 is located on the tooth A5.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

Examples of bicycles, in which the embodiments of the present invention may be employed, may be found in the following U.S. Pat. Nos.: 5,324,059, which issued to Bryne on Jun. 28, 1994; 5,312,125 which issued to Tse-acu-a-o-shu on May 17, 1994; 5,242,182, which issued to Bezerra et al. on Sep. 7, 1993; and 5,240,268, which issued to Allsop et al. on Aug. 31, 1993, all of the above-mentioned U.S. patents being hereby expressly incorporated by reference as if set forth in their entirety herein.

Examples of derailleurs, which may be utilized in accordance with the embodiments of the present invention, may be found in the following U.S. Pat. Nos.: 4,439,171, which issued to Bergles on Mar. 27, 1984; 4,231,264, which issued to Bergles on Nov. 4, 1980; 4,183,255, which issued to Leiter on Jan. 15, 1980; and 3,927,904, which issued to Bergles on Dec. 23, 1975, all of the above-mentioned U.S. Patents being hereby expressly incorporated by reference as if set forth in their entirety herein.

The corresponding foreign patent publication applications, namely, Federal Republic of Germany Patent Application No. P 44 45 035.4, filed on Dec. 16, 1994, having inventors Frank Schmidt, Jörg Bodmer and Andreas Neuer, and DE-OS P 44 45 035.4 and DE-PS P 44 45 035.4, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A sprocket assembly, such as for a bicycle, for driving a link chain, said sprocket assembly including a plurality of sprockets and being adapted for use in conjunction with a derailleur for shifting the link chain between said plurality of sprockets, said sprocket assembly comprising:

a first sprocket member;

a second sprocket member;

said first and second sprocket members having a common substantially central axis of rotation;

said first and second sprocket members both having a common direction of forward rotation about said substantially central axis of rotation;

each of said first and second sprocket members being a substantially planar member extending radially outward from said common substantially central axis of rotation;

said first sprocket member being disposed in a first sprocket plane, and said second sprocket member being disposed in a second sprocket plane substantially parallel to said first sprocket plane, each of said first sprocket plane and said second sprocket plane being aligned at a substantially right angle with respect to said common substantially central axis of rotation;

said first sprocket member having an inner face facing said second sprocket member and an outer face opposite to said second sprocket member;

said first sprocket member having a first substantially circular sprocket periphery and first sprocket teeth projecting radially outward from said common substantially central axis of rotation, said first sprocket teeth being disposed about the circumference of said first sprocket periphery;

said second sprocket member having a second substantially circular sprocket periphery and second sprocket teeth projecting radially outward from said common substantially central axis of rotation, said second sprocket teeth being disposed about the circumference of said second sprocket periphery;

said first sprocket member having a substantially greater diameter than said second sprocket member;

a chain transfer assistance member projecting from said inner face of said first sprocket member toward said second sprocket member;

said chain transfer assistance member being disposed between said first sprocket teeth and said common substantially central axis of rotation;

said chain transfer assistance member having a substantially curvilinear outer perimeter disposed in a plane substantially parallel to said first sprocket plane;

said first sprocket periphery comprising a normal portion and a chain upshifting portion;

said normal portion of said first sprocket periphery comprising a multiplicity of said first sprocket teeth disposed along said first sprocket periphery at positions of substantially equal tooth pitch; and said chain upshifting portion of said first sprocket periphery comprising:
- a tooth space disposed at a position of said substantially equal tooth pitch with respect to said multiplicity of said first sprocket teeth; and
- a capture tooth positioned adjacent said tooth space, and trailing said tooth space along said circumference of said first sprocket member in said direction of forward rotation, said capture tooth having a beveled tooth tip, said beveled tooth tip having a beveled surface on said outer face of said first sprocket member opposite to said second sprocket member;
- said beveled surface extending from said outer face of said first sprocket member opposite said second sprocket member in a direction toward said second sprocket member.

2. A sprocket assembly according to claim 1, wherein said chain transfer assistance member comprises:

a conical rivet projecting from said inner face of said first sprocket member toward said second sprocket member;

said conical rivet comprising a larger diameter substantially circular cross section and a smaller diameter substantially circular cross section, said larger diameter cross section being disposed axially outward from said inner face of said first sprocket member and said smaller diameter cross section being disposed adjacent said inner face of said first sprocket member, said conical rivet additionally comprising a conical section disposed between and tapering from said larger diameter cross section to said smaller diameter cross section; and said larger diameter cross section of said conical rivet having a periphery comprising a substantially sharp edge for engaging the link chain.

3. A sprocket assembly according to claim 2, wherein said chain upshifting portion of said first sprocket periphery additionally comprises:

a leading tooth positioned adjacent said tooth space and preceding said tooth space along said circumference of said first sprocket member in said forward direction of rotation;

said conical rivet being positioned substantially adjacent to said leading tooth and substantially between said substantially central axis of rotation and said leading tooth;

a second beveled surface provided on a lateral side of said leading tooth adjacent said tooth space;

said second beveled surface extending from said inner face of said first sprocket member facing said second sprocket member toward said outer face of said first sprocket member opposite said second sprocket member and in a direction toward said tooth space;

a convexly curved surface projecting from said inner face of said first sprocket member toward said second sprocket member;

said convexly curved surface partially encircling said first sprocket member;

said convexly curved surface being disposed between said first sprocket teeth and said substantially central axis of rotation;

said convexly curved surface being interrupted by a recess for accommodating the link chain in passage from said second sprocket member to said first sprocket member; and said recess being disposed ahead of said tooth space in said direction of forward rotation; and said conical portion of said conical rivet forms an angle of less than 90 degrees with said larger diameter cross section of said rivet.

4. A sprocket assembly according to claim 3, wherein:

a tooth base surface extends between the base portions of said first sprocket teeth; and said chain upshifting portion of said first sprocket periphery additionally comprises:
- a tooth base surface portion located between said leading tooth and said capture tooth at said position of said tooth space, said tooth base surface portion extending radially inward toward said common substantially central axis of rotation along said circumference of said first sprocket member in said direction of forward rotation.

5. A sprocket assembly according to claim 4, wherein said chain upshifting portion of said first sprocket periphery additionally comprises:

an additional capture tooth, said additional capture tooth trailing said capture tooth along said circumference Of said first sprocket member in said direction of forward rotation;

said additional capture tooth having an additional beveled tooth tip, said additional beveled tooth tip having an additional beveled surface on said outer face of said first sprocket member opposite to said second sprocket member; and said additional beveled surface also extending from said outer face of said first sprocket member opposite said second sprocket member in a direction toward said second sprocket member.

6. A sprocket assembly according to claim 5, wherein said first sprocket periphery comprises at least two of said chain upshifting portions, said at least two chain upshifting portions being disposed substantially 180° apart about said circumference of said first sprocket periphery.

7. A sprocket assembly according to claim 6, wherein:

said sprocket assembly additionally comprises a pair of pedal crank members for imparting a rotational torque to said sprocket assembly, said pair of pedal crank members extending radially outward from said common substantially central axis of rotation in directions substantially 180° apart, and said at least two chain upshifting portions are disposed with respect to the derailleur such that the link chain is shifted between said first and second sprocket members when said pair of pedal crank members are in a substantially vertical orientation when the bicycle is in its normal operative disposition.

8. A sprocket assembly according to claim 7, wherein said first sprocket periphery additionally comprises:

an additional leading tooth preceding said leading tooth along said circumference of said first sprocket member in said forward direction of rotation;

said additional leading tooth having a third beveled surface on said outer face of said first sprocket member;

said third beveled surface extending from said outer face of said first sprocket member radially outward and toward said second sprocket member.

9. A sprocket assembly according to claim 1, wherein said first sprocket periphery additionally comprises:

chain downshift assistance means for assisting the transfer of the link chain from said first sprocket member to said second sprocket member, said chain downshift assistance means being disposed adjacent said tooth space.

10. A sprocket assembly according to claim 9, wherein said chain downshift assistance means comprises a first chain downshift portion provided on said first sprocket periphery, said first chain downshift portion of said first sprocket periphery comprising:

first, second and third downshift teeth disposed in a sequence and preceding said tooth space along said circumference of said first sprocket member in said forward direction of rotation, said third downshift tooth being closest to said tooth space;

each of said first, second and third downshift teeth having lateral sides extending substantially radially, an inner face facing said second sprocket member and an outer face opposite to said second sprocket member; and a first downshift bevel provided on a lateral side of said first downshift tooth, said first downshift bevel slanting obliquely from said outer face of said first downshift tooth to said inner face of said first downshift tooth and said first downshift bevel being disposed on its tooth on the side toward said tooth space;

a second downshift bevel provided on a lateral side of said second downshift tooth, said second downshift bevel slanting obliquely from said outer face of said second downshift tooth to said inner face of said second downshift tooth and said second downshift bevel being disposed on its tooth on the side toward said tooth space;

and a step surface provided on said inner face of said second downshift tooth, said step surface being disposed radially outward of said tooth base surface and extending toward said second sprocket member.

11. A sprocket assembly according to claim 10, wherein:

each of said first, second and third downshift teeth has leading lateral side facing said forward direction of rotation and a trailing lateral side facing away from said forward direction of rotation;

said first downshift bevel is disposed on said trailing lateral side of said first downshift tooth; and said second downshift bevel is disposed on said trailing lateral side of said second downshift tooth.

12. A sprocket assembly according to claim 11, wherein said first downshift portion additionally comprises:

a recessed tooth base surface provided on said inner face of said first sprocket member, said recessed tooth base surface being disposed between said tooth space and said third downshift tooth and extending from said inner face of said first sprocket member toward said outer face of said first sprocket member.

13. A sprocket assembly according to claim 12, wherein said first chain downshift portion additionally comprises:

a protrusion provided on said inner face of said third downshift tooth, said protrusion extending toward said second sprocket member.

14. A sprocket assembly according to claim 13, wherein said protrusion has a convex surface extending toward said second sprocket member and is provided with angled edges extending at least partially over said convex surface.

15. A sprocket assembly according to claim 14, wherein said chain downshift assistance means additionally comprises a second chain downshift portion provided on said first sprocket periphery, said second chain downshift portion comprising:

a fourth downshift tooth preceding said tooth space along said circumference of said first sprocket member in said direction of forward rotation and disposed between said tooth space and said third downshift tooth.

16. A sprocket assembly according to claim 15, wherein said chain downshift assistance means additionally comprises a third downshift portion provided on said first sprocket periphery, said third downshift portion comprising:

fifth and sixth downshift teeth trailing said tooth space in sequence along said circumference of said first sprocket member in said forward direction of rotation;

each of said fifth and sixth downshift teeth also having an inner face facing said second sprocket member, an outer face opposite to said second sprocket member, a leading lateral side facing said forward direction of rotation and a trailing lateral side facing away from said forward direction of rotation;

a fifth downshift bevel provided on said trailing lateral edge of said fifth downshift tooth, said fifth downshift bevel extending from said outer face of said fifth downshift tooth to said inner face of said fifth downshift tooth; and a sixth downshift bevel provided on said leading lateral side of said sixth downshift tooth, said sixth downshift bevel extending from said outer face of said sixth downshift tooth to said inner face of said sixth downshift tooth.

17. A sprocket assembly according to claim 16, wherein said chain downshift assistance means additionally comprises a fourth downshift portion provided on said first sprocket periphery, said fourth downshift portion comprising:

a seventh downshift tooth trailing said sixth downshift tooth along said circumference of said first sprocket member in said forward direction of rotation;

said seventh downshift tooth also having an inner face facing said second sprocket member, an outer face opposite to said second sprocket member, a leading lateral side facing said forward direction of rotation and a trailing lateral side facing away from said forward direction of rotation;

a seventh downshift bevel provided on said leading edge of said seventh downshift tooth, said seventh downshift bevel extending from said outer face of said seventh downshift tooth to said inner face of said seventh downshift tooth; and a second recessed tooth base surface provided on said inner face of said first sprocket member, said recessed tooth base trailing said seventh downshift tooth along said circumference of said first sprocket member in said forward direction of rotation, and said second recessed tooth base surface extending from said inner face of said first sprocket member toward said outer face of said first sprocket member.

18. A sprocket assembly according to claim 17, wherein said first sprocket periphery comprises at least two each of:
said chain upshifting portions; and
said first, second, third and fourth chain downshifting portions;
disposed substantially about 180° apart about said circumference of said first sprocket periphery.

19. A sprocket assembly according to claim 18, wherein:
said sprocket assembly additionally comprises a pair of pedal crank members for imparting a rotational torque to said sprocket assembly, said pair of pedal crank members extending radially outward from said common substantially central axis of rotation in directions substantially 180° apart, and
said at least two chain upshifting portions and said at least two first, second, third and fourth chain downshifting portions are disposed with respect to the derailleur such that the link chain is shifted between said first and second sprocket members when said pair of pedal crank members are in a substantially vertical orientation when the bicycle is in its normal operative disposition.

20. A sprocket assembly, such as for a bicycle, for driving a link chain, said sprocket assembly including a plurality of sprockets and being adapted for use in conjunction with a derailleur for shifting the link chain between said plurality of sprockets, the link chain comprising inner chain plate pairs and outer chain plate pairs, the inner chain plate pairs and the outer chain plate pairs being disposed alternately in series and pivotally joined by pivot points, said sprocket assembly comprising:

a first sprocket member;

a second sprocket member;

said first and second sprocket members having a common substantially central axis of rotation;

said first and second sprocket members both having a common direction of forward rotation about said substantially central axis of rotation;

each of said first and second sprocket members being a substantially planar member extending radially outward from said common substantially central axis of rotation;

said first sprocket member being disposed in a first sprocket plane, and said second sprocket member being disposed in a second sprocket plane substantially parallel to said first sprocket plane, each of said first sprocket plane and said second sprocket plane being aligned at a substantially right angle with respect to said common substantially central axis of rotation;

said first sprocket member having an inner face facing said second sprocket member and an outer face opposite to said second sprocket member;

said first sprocket member having a first substantially circular sprocket periphery and first sprocket teeth projecting radially outward from said common substantially central axis of rotation, said first sprocket teeth being disposed about the circumference of said first sprocket periphery;

said second sprocket member having a second substantially circular sprocket periphery and second sprocket teeth projecting radially outward from said common substantially central axis of rotation, said second sprocket teeth being disposed about the circumference of said second sprocket periphery;

said first sprocket member having a substantially greater diameter than said second sprocket member;

a chain transfer assistance member projecting from said inner face of said first sprocket member toward said second sprocket member;

said chain transfer assistance member being disposed between said first sprocket teeth and said common substantially central axis of rotation;

said chain transfer assistance member having a substantially curvilinear outer perimeter disposed in a plane substantially parallel to said first sprocket plane;

said chain transfer assistance member comprising a conical rivet projecting from said inner face of said first sprocket member toward said second sprocket member;

said conical rivet comprising a larger diameter substantially circular cross section and a smaller diameter substantially circular cross section, said larger diameter cross section being disposed axially outward from said inner face of said first sprocket member and said smaller diameter cross section being disposed adjacent said inner face of said first sprocket member, said rivet additionally comprising a conical section disposed between and tapering from said larger diameter cross section to said smaller diameter cross section;

said larger diameter cross section of said conical rivet having a periphery comprising a substantially sharp edge for engaging the link chain adjacent a pivot point of the link chain and between an outer plate of the link chain and an inner plate of the link chain;

said first sprocket periphery comprising a normal portion and a chain upshifting portion;

said normal portion of said first sprocket periphery comprising a multiplicity of said first sprocket teeth disposed along said first sprocket periphery at positions of substantially equal tooth pitch;

said chain upshifting portion of said first sprocket periphery comprising:
a tooth space disposed at a position of said substantially equal tooth pitch with respect to said multiplicity of said first sprocket teeth; and
a capture tooth positioned adjacent said tooth space, and trailing said tooth space along said circumference of said first sprocket member in said direction of forward rotation, said capture tooth having a beveled tooth tip, said beveled tooth tip having a beveled surface on said outer face of said first sprocket member opposite to said second sprocket member;
said beveled surface extending from said outer face of said first sprocket member opposite said second sprocket member in a direction toward said second sprocket member;

a convexly curved surface projecting from said inner face of said first sprocket member toward said second sprocket member;

said convexly curved surface partially encircling said first sprocket member;

said convexly curved surface being disposed between said first sprocket teeth and said substantially central axis of rotation;

said convexly curved surface being interrupted by a recess for accommodating the link chain in passage from said second sprocket member to said first sprocket member; and said recess being disposed ahead of said tooth space in said direction of forward rotation.

* * * * *